United States Patent
Formo et al.

(10) Patent No.: US 9,544,763 B2
(45) Date of Patent: Jan. 10, 2017

(54) DISCLOSING AND CONTROLLING COLLECTION OF INFORMATION FROM ELECTRONIC DEVICES

(71) Applicant: Telefonaktiebolaget L M Ericsson (publ), Stockholm (SE)

(72) Inventors: Joakim Formo, Åkersberga (SE);
Mikael Anneroth, Enebyberg (SE);
Elena Fersman, Sundbyberg (SE);
Farjola Zaloshnja, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 621 days.

(21) Appl. No.: 13/967,996

(22) Filed: Aug. 15, 2013

(65) Prior Publication Data
US 2015/0050915 A1    Feb. 19, 2015

(51) Int. Cl.
H04W 12/02    (2009.01)
H04L 29/08    (2006.01)

(52) U.S. Cl.
CPC .............. *H04W 12/02* (2013.01); *H04L 67/12* (2013.01)

(58) Field of Classification Search
CPC .................................................... H04W 12/02
See application file for complete search history.

(56) References Cited

U.S. PATENT DOCUMENTS

| | | |
|---|---|---|
| 2008/0168469 A1 | 7/2008 | Feingold et al. |
| 2011/0084800 A1 | 4/2011 | Ko et al. |
| 2012/0280783 A1* | 11/2012 | Gerhardt ............ G07C 9/00309 340/5.6 |
| 2013/0012231 A1 | 1/2013 | Hall |

FOREIGN PATENT DOCUMENTS

EP    1 770 622 A1    4/2007

OTHER PUBLICATIONS

Written Opinion of the International Preliminary Examining Authority, PCT/SE2013/051000, Aug. 27, 2015.
International Search Report, PCT/SE2013/051000, Dec. 12, 2013.
Written Opinion of the International Searching Authority, PCT/SE2013/051000, Dec. 12, 2013.

* cited by examiner

*Primary Examiner* — Vladimir Magloire
*Assistant Examiner* — David Orange
(74) *Attorney, Agent, or Firm* — Myers Bigel, P.A.

(57) ABSTRACT

One method by a network operations center node controls collection of information from electronic devices. A request message is received from a sensor, which requests collection of information from electronic devices within range of the sensor. One of a plurality of radio access networks is selected based on it likely being communicatively connected to electronic devices within range of the sensor. An inquiry message is sent to the radio access network for broadcast to the electronic devices, requesting information from the electronic devices. An authentication message is received from a responsive electronic device. An information collection disclosure response that identifies who is requesting collection of the information from the electronic device and/or how information collected from the electronic device will be used, is sent to the electronic device. Related methods by sensors and electronic devices, and related sensors, network operations center nodes, and electronic devices are disclosed.

20 Claims, 9 Drawing Sheets

Logically associate the information collected from the electronic devices with data sensed by the sensor relating to the electronic devices and/or users of the electronic devices within range of the sensor — 1200

*Figure 12*

Generate metadata from the information collected from the electronic devices — 1300

Send within a shared data stream the metadata and the data sensed by the sensor relating to the electronic devices and/or users of the electronic devices within range of the sensor — 1302

*Figure 13*

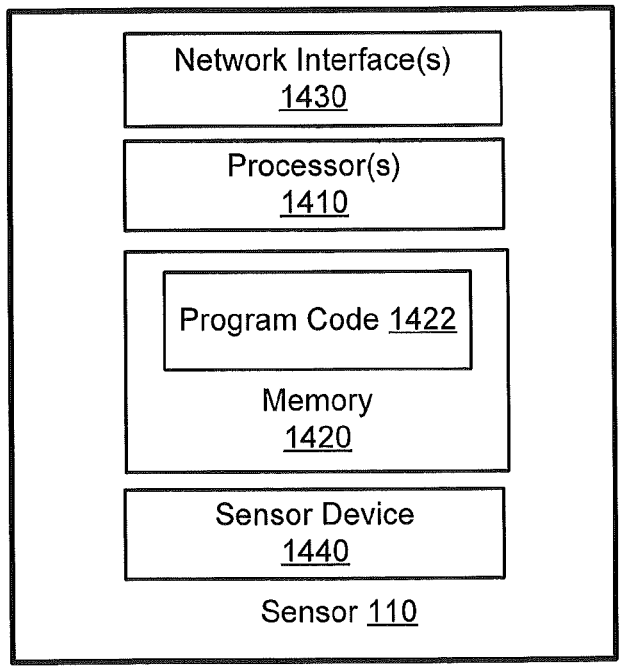

*Figure 14*

DISCLOSING AND CONTROLLING COLLECTION OF INFORMATION FROM ELECTRONIC DEVICES

TECHNICAL FIELD

The present disclosure relates to the computer systems and, more particularly, to controlling communications between electronic devices.

BACKGROUND

It has become commonplace for sensors located in public spaces that continuously collect information. For example, some businesses monitor the use of electronic devices by customers and have the ability to read information from sensors embedded in the electronic devices for use in targeted marketing. Such information collection is predicted to increase in the future with the further proliferation of numbers, types, and capabilities of user electronic devices forming a Networked Society. Users are typically unaware that information is being collected about them by devices placed in public spaces (e.g., Closed Circuit Television (CCTV) cameras, microphones, etc.) or from their own electronic devices (e.g., location, application use, communications history, etc.). Furthermore, there is a lack of disclosure to users of who is collecting such information and how it will be used.

There is growing concern by users that their privacy is being improperly infringed upon by such information collection. Such concern can unfortunately degrade peoples' trust and other relations with private/public entities who may or may not be directly involved in collection of user information, such as cellular network operators, retail establishments, local/national governments, etc.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

To address the foregoing problems identified in the Background, the following disclosure describes methods, sensors, network operations center nodes, and user operated electronic devices that disclose information collection activities and relatedly control collection of such information.

One embodiment is directed to a method by a network operations center node for controlling collection of information from electronic devices. The method includes receiving a request message from a sensor. The request message requests collection of information from electronic devices that are within range of the sensor. One of a plurality of radio access networks is selected based on it likely being communicatively connected to electronic devices that are within range of the sensor. An inquiry message is sent to the one of the radio access networks for broadcast to the electronic devices. The inquiry message requests information from the electronic devices. An authentication message is received from one of the electronic devices which is responding to the inquiry message. The authentication message requests an information collection disclosure response. The information collection disclosure response identifying who is requesting collection of the information from the one of the electronic devices and/or how information collected from the one of the electronic devices will be used, is sent to the one of the electronic devices.

Potential advantages of this and other embodiments can include disclosing to persons when, why, and/or how they are being observed by sensors and enabling user operated electronic devices to have at least some control over whether and/or what information is disclosed to a network operations center node which is collecting the information for use by and/or with the sensors. Disclosing such information collection activities and possibly enabling user control thereof can establish a level of trust and increase the trust persons have with various entities involved with collecting/using the information. This trust may motivate persons to share information that may not otherwise be observable by the sensors, such as the user's location, name, home address, account information, telephone number and are messaging address, description of appearance or other attributes, etc. Moreover, improvements in the information collection activities may be achieved by persons granting access to additional information (e.g., information that is not otherwise accessible to the node/sensor) relating to the persons and/or the electronic devices.

Another related embodiment is directed to a method by an electronic device for controlling collection of information from the electronic device by a network operations center node connected through a radio access network. The method includes receiving an inquiry message broadcasted by the radio access network to a plurality of electronic devices. The inquiry message requests information from the electronic devices for sending to a sensor having a sensing range likely inclusive of the electronic devices. An authentication message is sent to the network operations center node that requests an information collection disclosure response. The information collection disclosure response is received from the network operations center node that identifies an entity who is requesting collection of the information from the electronic device and/or how information collected from the electronic device will be used. A determination is made whether a response to the inquiry message is authorized based on the information collection disclosure response. When a response is determined to be authorized, information requested by the inquiry message is sent.

Yet another related embodiments directed to a method by a sensor for collecting information from electronic devices. The method includes registering the sensor with a network operations center node. Information collection disclosure data is sent to the network operations center node identifying who is requesting collection of information from electronic devices within range of the sensor and/or how information collected from the electronic devices will be used. A request message is sent to the network operations center node. The request message requesting collection of information from electronic devices which are within range of the sensor. Information is received from the network operations center node that is collected from electronic devices which are likely within range of the sensor. The sensor is operated responsive to the information collected from the electronic devices.

Other methods, sensors, nodes, and electronic devices according to embodiments of the invention will be or become apparent to one with skill in the art upon review of the following drawings and detailed description. It is intended that all such additional methods, network nodes, and mobile stations be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 12-13 illustrate flowcharts of related operations and methods by a sensor according to some embodiments;

FIG. 14 is a block diagram of an example sensor of FIGS. 1 and 2A-B that is configured according to some embodiments;

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

One or more of the foregoing problems may be overcome by various embodiments disclosed herein. Some embodiments are directed to methods and system elements that disclose information collection activities by sensors to user operated electronic devices that are likely within range of the sensors, and can further enable the electronic devices to control whether and/or what information is disclosed. The disclosure can include informing persons when, why, and/or how they are being observed by sensors and can enable persons to have at least some control over whether and/or what information is disclosed to a network operations center node which is collecting the information for use by and/or with the sensors. Disclosing such information collection activities and possibly enabling user control thereof can establish a level of trust and increase the trust persons have with various entities involved with collecting/using the information. This trust may motivate persons to share information that may not otherwise be observable by the sensors, such as the user's location, name, home address, account information, telephone number and are messaging address, information gathered by the user's device (e.g., sensed accelerometer data, GPS location(s), applications presently being executed and/or historically executed, etc.), description of appearance or other attributes, etc. Moreover, improvements in the information collection activities may be achieved by persons granting access to additional information (e.g., information that is not otherwise accessible to the node/sensor) relating to the persons and/or the electronic devices.

Figure 1:
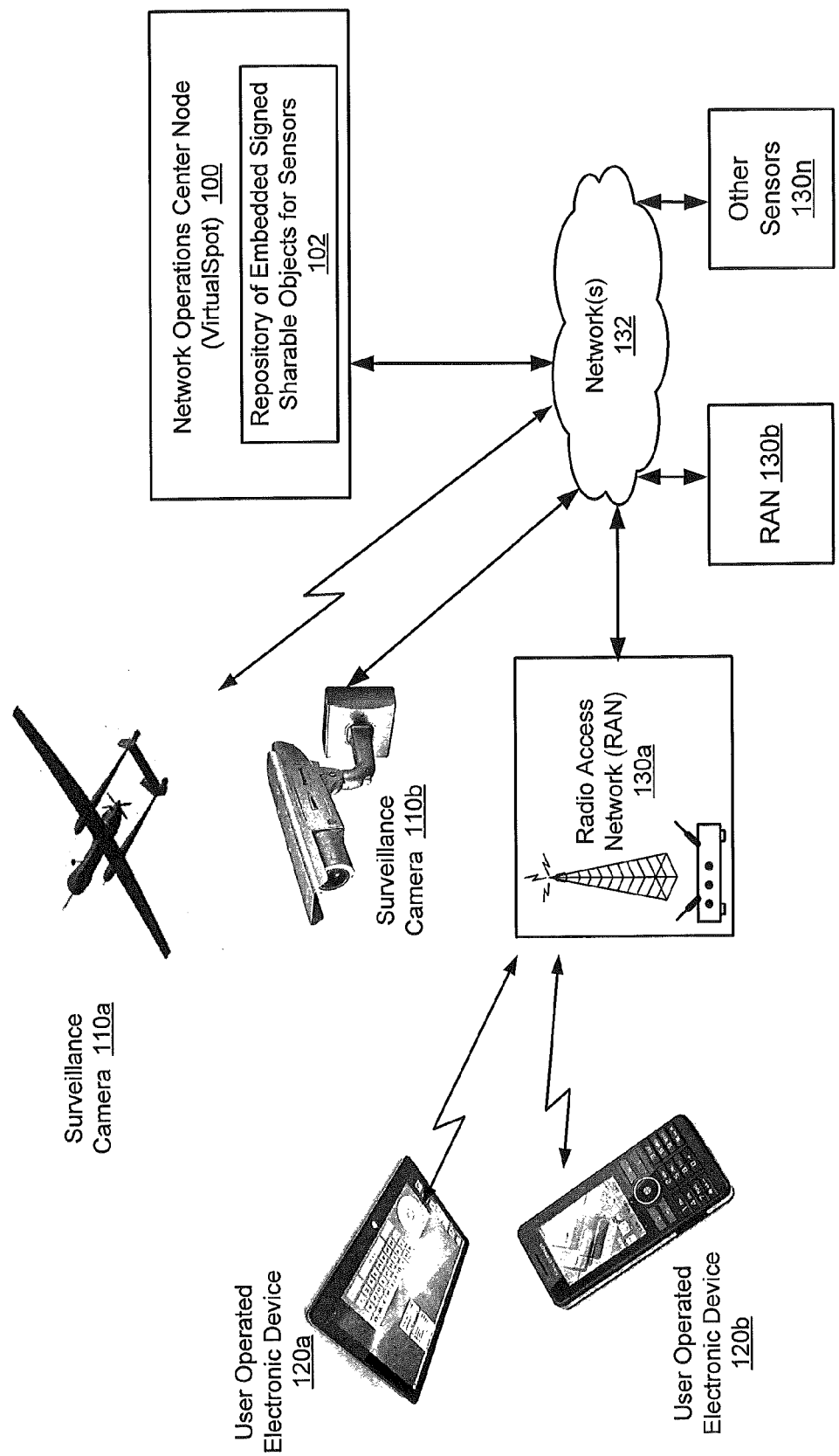
FIG. 1 is an example block diagram of a system that includes a plurality of sensors that collect information about user operated electronic devices under the control of a network operations center node, in accordance with some embodiments.
Figure 2A:
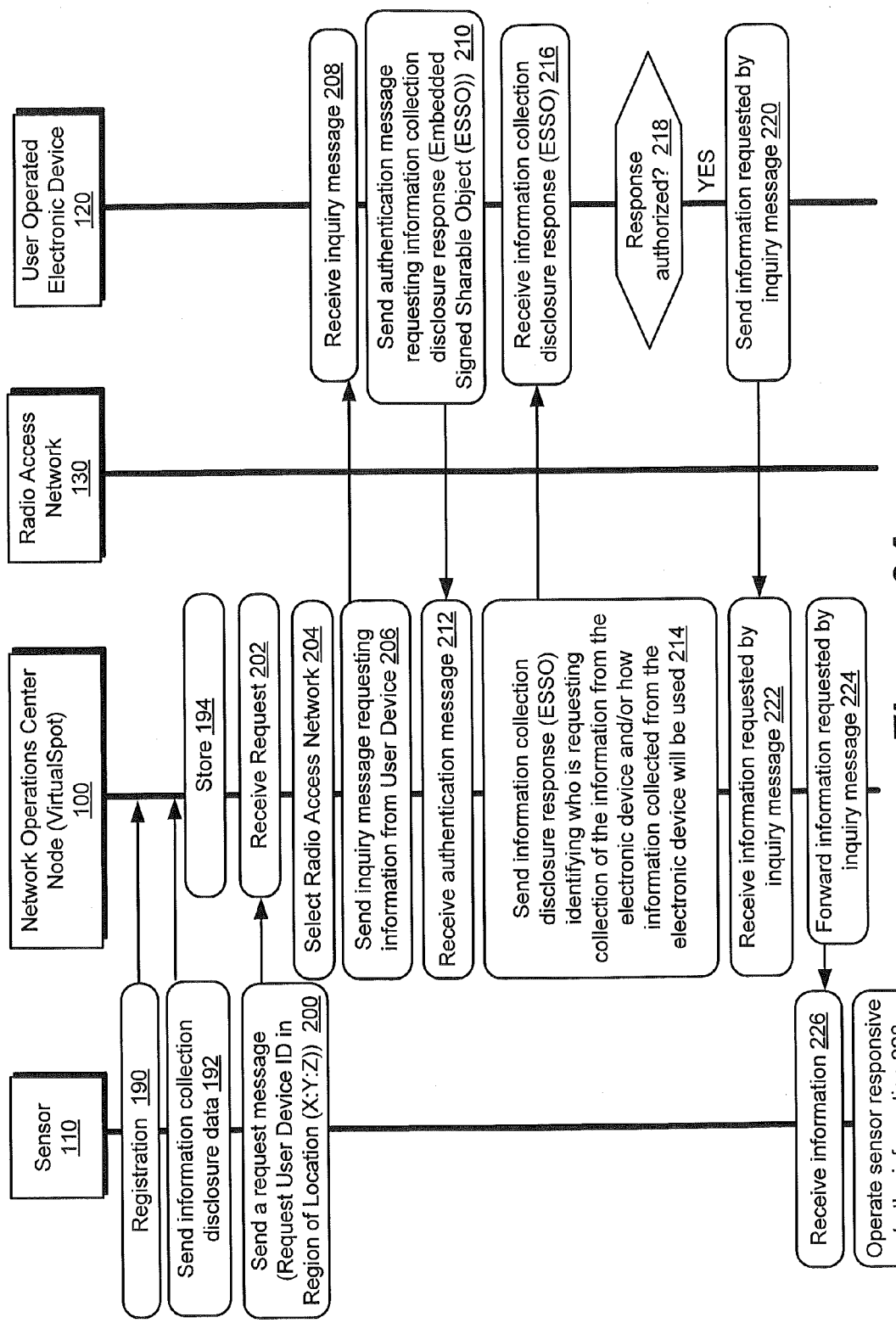
FIGS. 2A-B illustrates a diagram of operations, methods and associated message flows between various components of the system of FIG. 1 for controlling collection of information from the electronic devices according to some embodiments.
Figure 2B:
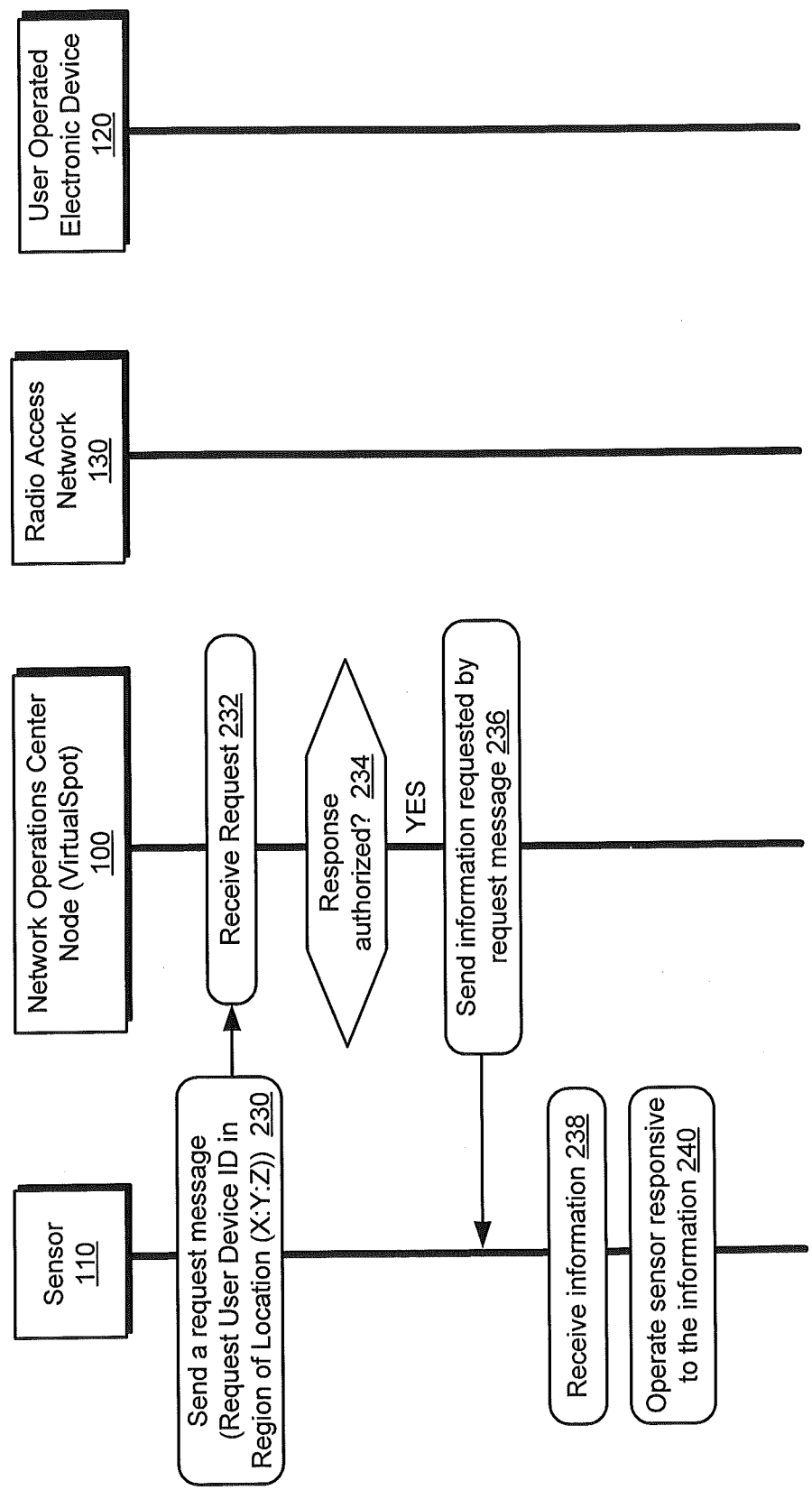

FIG. 1 is an example block diagram of a system that includes a plurality of sensors 110 (e.g., aircraft or drone including a surveillance camera 110a, security system including a surveillance camera 110b, . . . 110n, etc.) that collect information about user operated electronic devices 120 under the control of a network operations center node 100, which may be referred to as a virtualspot, in accordance with some embodiments. The network operations center node 100 may operate as, for example, a cloud service. FIGS. 2A-B illustrates a diagram of operations, methods and associated message flows between these and other components of the system of FIG. 1 for controlling collection of information from the electronic devices 120 according to some embodiments.

Referring to FIGS. 1 and 2A-B, the electronic devices 120 can include, but are not limited to, cellular telephones, personal digital assistants, smart phones, tablet computers, laptop computers, and other devices with wireless communication capabilities. The sensors 110 can include, but are not limited to, video cameras, still frame picture cameras, audio microphones, communications equipment that monitors text messaging, phone calls, etc. by electronic devices by querying such information therein and/or from other network components (e.g., service provider records), temperature sensors, biometric sensors (e.g., fingerprint/palm scanners, facial recognition scanners, iris recognition scanners, etc.).

The electronic devices 120 communicate through radio access networks 130 (e.g., 130a, 130b, etc.) with the network operations center node 100 via one or more data networks 132 (e.g., local area network, metropolitan area network, wide area network, Internet). The sensors 110 communicate with the network operations center node 100 via the one or more data networks 132.

The sensors 110 can register (block 190, FIG. 2A) with the network operations center node 100. The registration can include having each sensor 110 provide their network address and other information that characterizes the sensor 110, such as a location of the sensor 110. The sensor 110 can send (block 192, FIG. 2A) information collection disclosure data to the network operations center node 100 that identifies who is requesting collection of information from electronic devices 120 within range of the sensor 110 and/or how information collected from the electronic devices 120 will be used. The network operations center node 100 can store (block 194, FIG. 2A) this and other information from the sensors 110 in a repository 102. For example in one embodiment, the information provided by a sensor 110 forms an Embedded Signed Shareable Object (ESSO) which is stored in the repository 102. The ESSO can include an embedded digital signature that is used by the one of the electronic devices 120 for verification of the associated sensor 110. Registration and sending of information collection disclosure data is optional, because such information, if needed, may be known by the network operations center node 100 by other defined processes.

The sensor 110 sends (block 200, FIG. 2A) a request message to the network operations center node 100, the request message requesting collection of information from electronic devices 120 which are within range of the sensor 110. The request message may, for example, request that all electronic devices 120 proximately located to a defined location (e.g., a region defined by a defined distance from the location) provide their device identifier and/or other information relating to the electronic devices 120 and/or users of the electronic devices 120.

The network operations center node 100 receives (block 202, FIG. 2A) the request message from the sensor 110. The network operations center node 100 selects (204, FIG. 2A) one of a plurality of radio access networks 130 based on the selected network likely being communicatively connected to electronic devices 120 that are within range of the sensor 110. The network operations center node 100 may therefore be configured to have access to and/or configured to determine the locations of the radio access networks 130 and/or the electronic devices 120. The network operations center node 100 may compare the proximity of each of the radio access networks 130 to the location identified by the request message from the sensor 110, to select (204, FIG. 2A) one of the radio access networks 130 based on it likely being communicatively connected to electronic devices 120 that are within range of the sensor 110.

Figure 11:
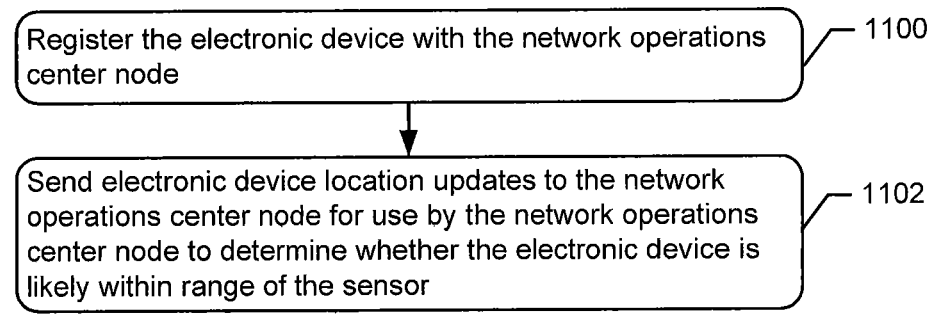

Electronic devices 120 may register with the network operations center node 100 and provide location updates thereto to enable the network operations center node 100 to determine location proximity of each of the electronic devices 120 to a particular sensor 110. For example, in the embodiment of FIG. 11, the electronic device 120 registers (block 1100) with the network operations center node 100, which may include providing a unique device identifier, network address, etc. The electronic device 120 then sends (block 1102) location updates to the network operations center node 100 for use by the network operations center node 100 to determine whether the electronic device 120 is likely within range of the sensor 110.

For example, the repository 102 in the network operations center node 100 may include identifiers and associated location information for each of the radio access networks 130, which may be provided thereto during a registration process between the radio access networks 130 and the network operations center node 100. Alternatively or additionally, the repository 102 may determine locations of the radio access networks 130 based on their network addresses and/or by requesting the radio access networks 130 to report their locations.

The network operations center node 100 may select among the radio access networks 130 based on other information, such as based on reports received from each of the radio access networks 130 which identify which electronic devices 120 are communicatively connected thereto. The radio access networks 130 may contain one or more cellular radio access technology systems that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution). The radio access networks 130 may alternatively or additional communicate with one or more of the electronic devices 120 through a Wireless Local Area Network (i.e., IEEE 802.11) interface, a Bluetooth interface, and/or other wireless communication interface.

The network operations center node 100 sends (block 206, FIG. 2A) an inquiry message to the one of the radio access networks 130 for broadcast to the electronic devices 120. The inquiry message requesting information from the electronic devices 120. An electronic device 120 receives (block 208, FIG. 2A) the inquiry message broadcasted by the radio access network 130. The inquiry message request information from the electronic devices 120 for sending to the sensor 110 having a sensing range likely inclusive of the electronic devices 120.

The inquiry message sent (block 206, FIG. 2A) to the selected radio access network 130 for broadcast, may requests at least one of the following from each of the electronic devices 120: name of a user of the electronic device 120; home address of the user of the electronic device 120; account information for the user of the electronic device 120; telephone number and/or messaging address for the electronic device 120; a sensed location of the electronic device 120; information gathered by the user's device (e.g., sensed accelerometer data, GPS tracked location(s), applications presently being executed and/or historically executed, etc.); and description of appearance of the user of the electronic device 120. This information requested from the electronic device 120 may, when authorized, be retrieved from a memory and/or sensed/gathered by one or more sensors or other electronic component of the electronic device 120. The inquiry message may request additional or other information from the electronic devices 120.

The electronic device 120 operates to obtain information from the network operations center node 100 that discloses who is requesting collection of information and/or how the collected information will be used. More particularly, the electronic device 120 sends (block 210, FIG. 2A) an authentication message to the network operations center node 100 that requests an information collection disclosure response. The authentication message may request an Embedded Signed Shareable Object (ESSO) from the network operations center node 100, where the ESSO may have been earlier provided by the sensor 110 to the node 100 during or after the registration process (block 190, FIG. 2A).

The network operations center node 100 receives (block 212, FIG. 2A) the authentication message from the electronic devices 120 which is responding to the inquiry message (via the selected radio access network 130), where the authentication message request an information collection disclosure response. The node 100 sends (block 214, FIG. 2A), to the requesting electronic device 120, the information collection disclosure response identifying who is requesting collection of the information from the one of the electronic devices 120 (e.g., identify cellular network operator, retail establishment(s), local/national government agenc(ies), etc.) and/or how information collected from the one of the electronic devices 120 will be used (e.g., provide targeted advertising, offer targeted products/services discounts, provide police/private security services for the persons, etc.).

The information collection disclosure response, sent to the requesting electronic devices 120 (via the selected radio access network 130), may further identify at least one of: an operational characteristic of the sensor 110 (e.g., what type of information the sensor gathers, such as video recording, still frame picture recording, audio recording, text messaging history recording, phone call history recording, device location tracking, fingerprint/palm scanning, facial recognition scanning, iris recognition scanning, etc.), location of the sensor 110; who the information collected from the electronic device 120 will be shared with (e.g., identify cellular network operator, retail establishment(s), local/national government agenc(ies), etc.); and how long the information collected from the electronic device 120 will be retained before permanent deletion from records in memory of the network operations center node 100.

As explained above, the information collection disclosure response sent (block 214, FIG. 2A) to the requesting electronic device 120, may contain an ESSO having an embedded digital signature for verification by the requesting electronic device 120 and which identifies who is requesting collection of the information from the one of the electronic devices 120 and/or how information collected from the one of the electronic devices 120 will be used.

The electronic device 120 receives (block 216, FIG. 2A) the information collection disclosure response from the network operations center node 100, and determines (block 218, FIG. 2A) whether a response to the inquiry message is authorized based on the information collection disclosure response. When a response is determined to be authorized (block 218, FIG. 2A), the electronic device 120 sends (block 220, FIG. 2A) information requested by the inquiry message.

The information sent (block 220, FIG. 2A) by the electronic device 120 may include at least one of the following: name of a user of the electronic device 120; home address of the user of the electronic device 120; account information for the user of the electronic device 120; telephone number and/or messaging address for the electronic device 120; a present location of the electronic device 120; information gathered by the electronic device 120 (e.g., sensed accelerometer data, GPS tracked location(s), applications presently being executed and/or historically executed, etc.); and description of appearance of the user of the electronic device 120 (which may have been entered by a user into a user profile retained in memory). Additional or other information may be sent by the electronic device 120 responsive to the inquiry request 208.

Figure 3:
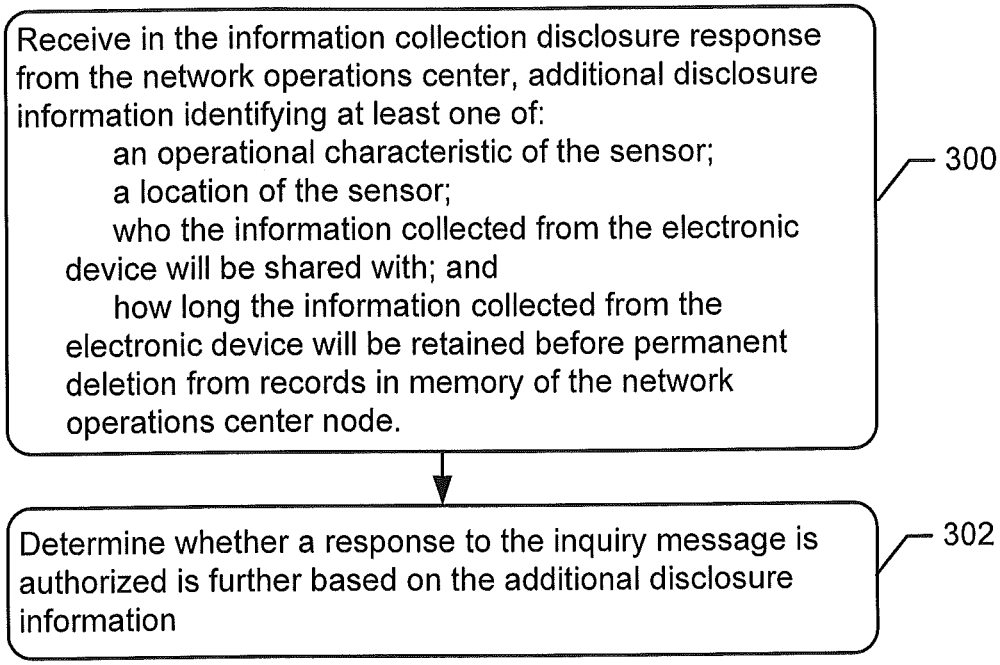
FIGS. 3-11 illustrate flowcharts of related operations and methods by a user operated electronic device according to some embodiments.

Referring to FIG. 3, the electronic device 120 can receive (block 300) additional disclosure information, as explained above, identifying at least one of: an operational characteristic of the sensor 110; a location of the sensor 110; who the information collected from the electronic device 120 will be shared with; and how long the information collected from the electronic device 120 will be retained before permanent deletion from records in memory of the network operations center node 100. The electronic device 120 can determine (block 218, FIG. 2A) whether a response to the inquiry message is authorized can be further determined (block 302) based on the additional disclosure information.

Other operations that the electronic device 120 may perform to determine whether a response is authorized (block 218, FIG. 2A) to the sent to the network operations center node 100 are shown in FIGS. 4-10.

Figure 4:
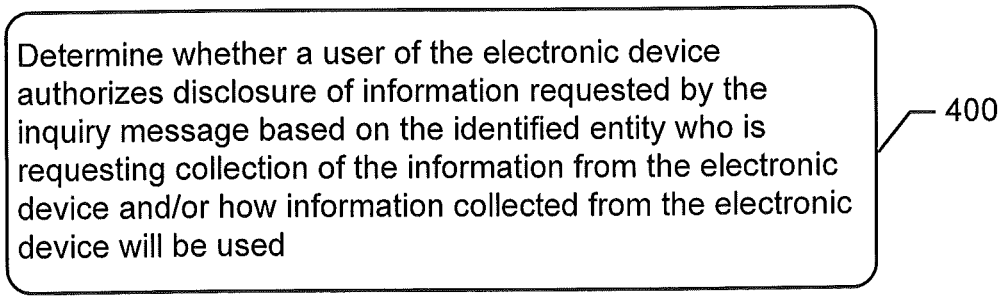
Figure 5:
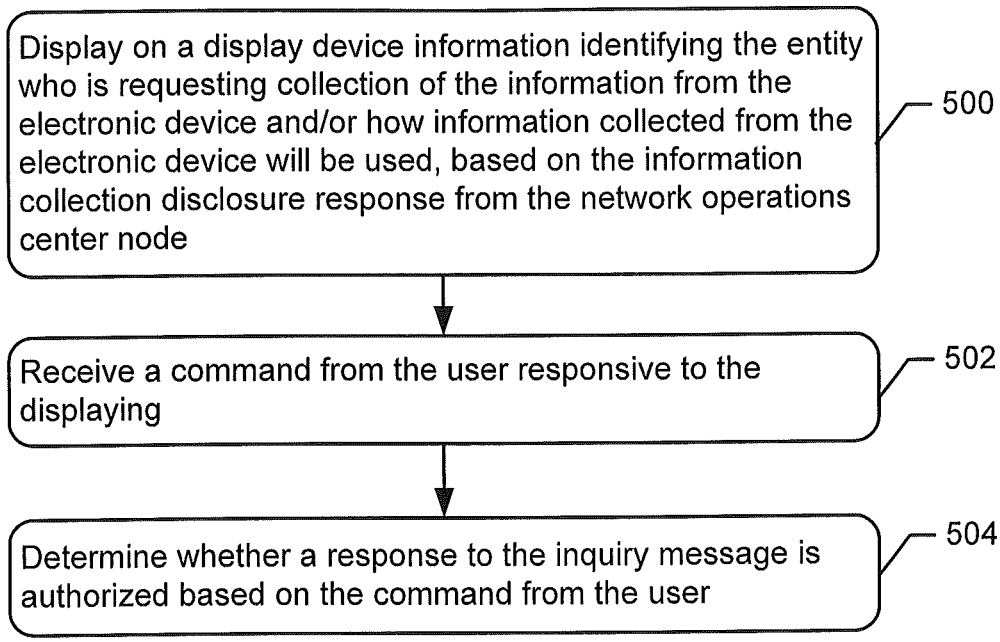

Referring to FIG. 4, the electronic device 120 determines (block 400) whether a user of the electronic device 120 authorizes disclosure of information requested by the inquiry message based on the identified entity who is requesting collection of the information from the electronic device 120 and/or how information collected from the electronic device 120 will be used. For example, by the further operations of FIG. 5, the electronic device 120 displays (block 500) on a display device information identifying the entity who is requesting collection of the information from the electronic device 120 and/or how information collected from the electronic device 120 will be used, which is determined based on the information collection disclosure response from the network operations center node 100. The electronic device 120 receives (block 502), via a user input interface, a command from the user responsive to the displaying. The electronic device 120 determines (block 504) whether a response to the inquiry message is authorized based on the command from the user.

Figure 6:
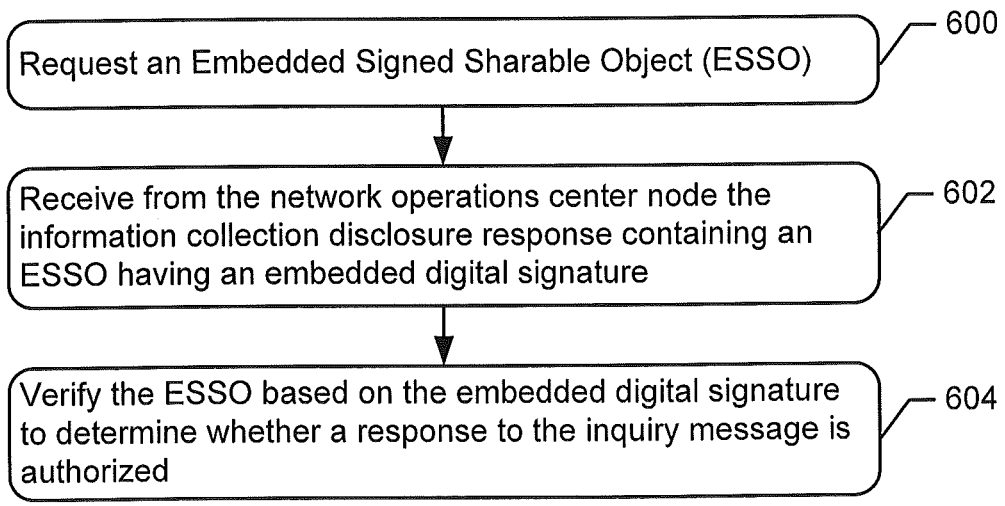

In another embodiment of FIG. 6, the authentication message, which is sent (block 210, FIG. 2A) to the network operations center node 100, requests (block 600) an Embedded Signed Sharable Object, ESSO. The information collection disclosure response, which is received (block 216 of FIG. 2A, block 602 of FIG. 6) from the network operations center node 100, contains an ESSO having an embedded digital signature. The electronic device 120 determines (block 218, FIG. 2A) whether a response to the inquiry message is authorized further by verifying (block 604) the ESSO based on the embedded digital signature.

Figure 7:
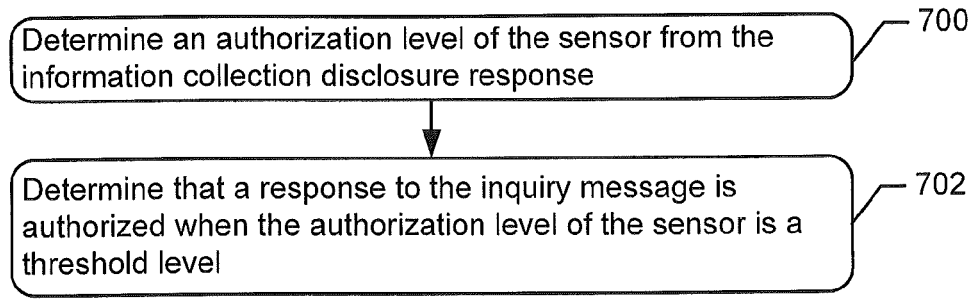
Figure 8:
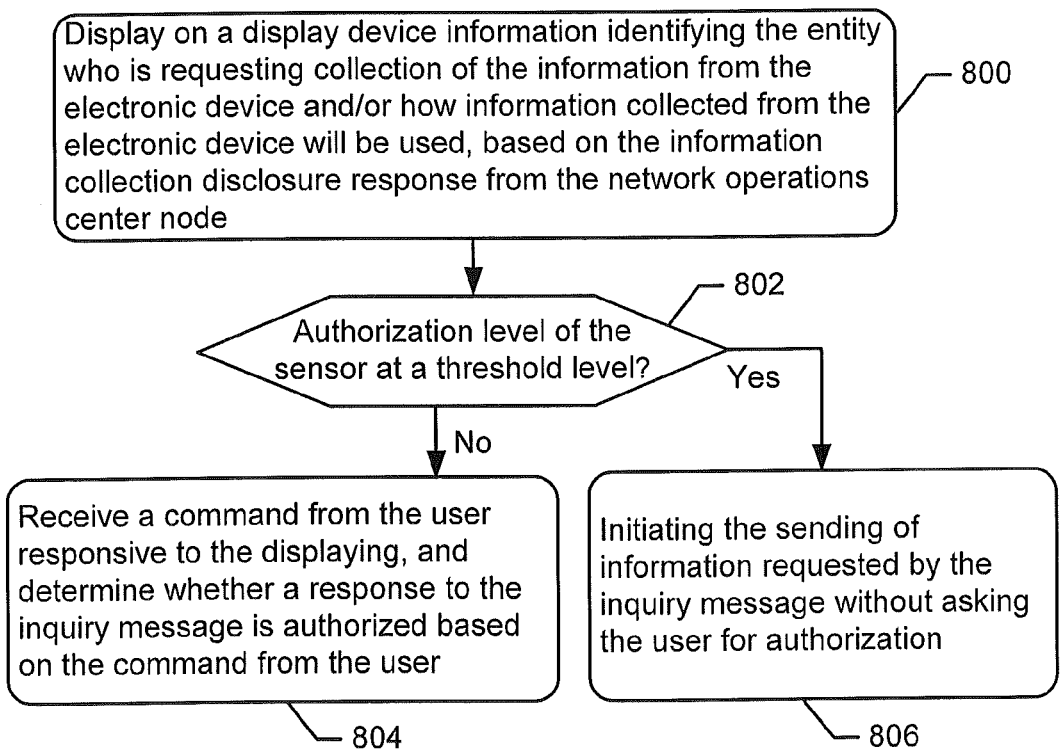

In another embodiment of FIG. 7, the electronic device 120 determines (block 218, FIG. 2A) whether a response to the inquiry message is authorized by determining (block 700) an authorization level of the sensor 110 from the information collection disclosure response, and determining (block 702) that a response to the inquiry message is authorized when the authorization level of the sensor 110 is a threshold level.

The authorization level of the sensor 110 determined in FIG. 7 can be further used to regulate whether or not a user controls sending of information requested by the inquiry message. In the further embodiment of FIG. 8, the electronic device 120 displays information (block 800) on a display device that identifies the entity who is requesting collection of the information from the electronic device 120 and/or how information collected from the electronic device 120 will be used, which is determined based on the information collection disclosure response from the network operations center node 100. The electronic device 120 determines (block 802) whether the authorization level of the sensor (110) is a threshold level. When the authorization level of the sensor 110 is the threshold level, the sending (220) of information requested by the inquiry message is initiated (block 806) without asking the user for authorization. In contrast, when the authorization level of the sensor 110 is not the threshold level, the electronic device 120 waits to receive (block 804) a command from the user responsive to the displaying 800, and determines (block 218, FIG. 2A) whether a response to the inquiry message is authorized based on the command from the user.

Figure 9:
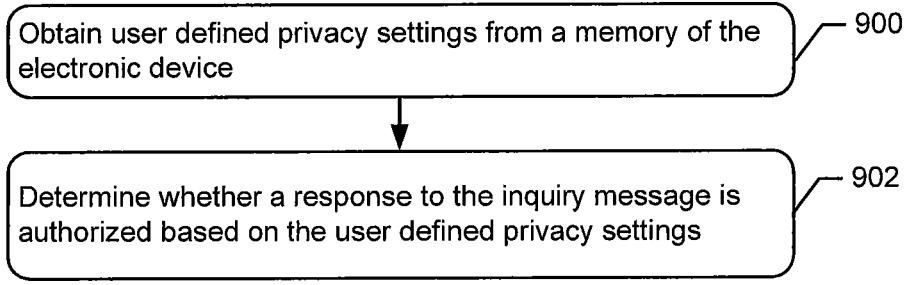

In another embodiment of FIG. 9, the electronic device 120 determines (block 218, FIG. 2A) whether a response to the inquiry message is authorized based on user defined privacy settings. The electronic device 120 obtains (block 900) user defined privacy settings from a memory of the electronic device 120, and determines (block 902) whether a response to the inquiry message is authorized based on the user defined privacy settings.

Figure 10:
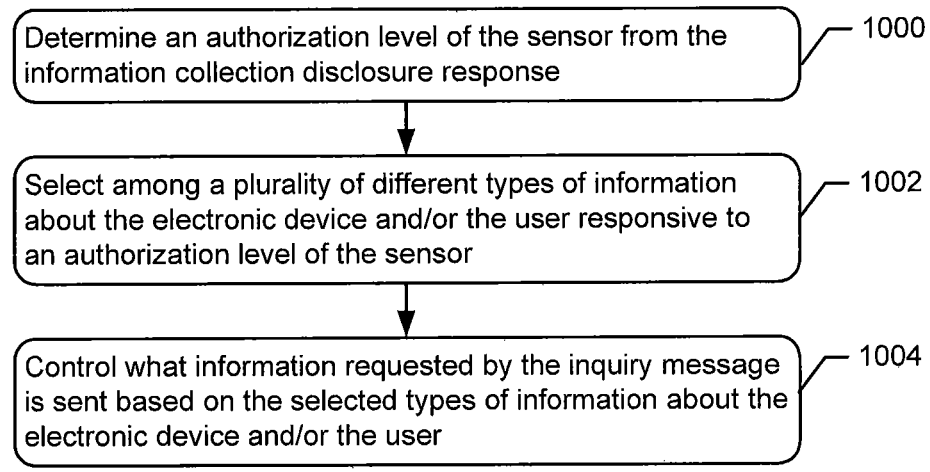

In another embodiment of FIG. 10, the electronic device 120 controls what type of information is sent to the network operations center node 100 responsive to the inquiry message. The electronic device 120 determines (block 1000) an authorization level of the sensor (110) from the information collection disclosure response. The electronic device 120 then selects (block 1002) among a plurality of different types of information about the electronic device 120 and/or the user responsive to an authorization level of the sensor 110, and controls (block 1004) what information requested by the inquiry message is sent 220 based on the selected types of information about the electronic device 120 and/or the user.

The different types of information about the electronic device 120 and/or the user, which are selected (block 1002) among by the electronic device 120, may include, but are not limited to, at least two of the following: name of a user of the electronic device 120; home address of the user of the electronic device 120; account information for the user of the electronic device 120; telephone number and/or messaging address for the electronic device 120; a present location of the electronic device 120; information gathered by the electronic device 120 (e.g., sensed accelerometer data, GPS tracked location(s), applications presently being executed and/or historically executed, etc.); and description of appearance of the user of the electronic device 120 (which may have been entered by a user into a user profile retained in memory).

The network operations center node 100 receives (block 222, FIG. 2A) the information requested by the inquiry message, from the responding electronic device 120, and forwards (block 224, FIG. 2A) the information requested by the inquiry message (e.g., all or part of the information, or other information that is generated based on information from the electronic device 120) to the sensor 110.

The sensor 110 receives (block 226, FIG. 2A) the information from the network operations center node 100, and controls its operation (block 228, FIG. 2A) responsive to the information.

The network operations center node 100 can operate to authorize further request messages from sensors 110 without requesting authorization from the electronic device 120 (e.g., without sending an inquiry message and ESSO to the electronic device 120). Operating the network operations center node 100 to authorize further request messages from sensors 110 without necessitating communication with the electronic device 120 reduces the communication traffic to the electronic device 120, reduces processing loading imposed on the electronic device 120, and enables the authorization process to proceed when the electronic device 120 cannot be communicatively connected to the network operations center node 100 (e.g., when the electronic device 120 is turned off).

For example, after authorizing the response (block 218), the electronic device 120 can send, in that same message that sends the information requested by the inquiry message or within a separate message, an authorization to the network operations center node 100 for particular types of information metadata that the network operations center node 100 is authorized to disclose to a sensor 110 without seeking authorization from the electronic device 120. For example, the electronic device 120 may authorize particular types of information relating to the electronic device 120 to be disclosed to a particular identified sensor 110 and/or to any sensor 110 having characterizes that satisfy one or more defined rules. The particular types of information can include metadata that the electronic device 120 has stored in the network operations center node 100. The electronic device 120 may, for example, provide initial information (e.g., such as information which does not change over time or changes relatively slowly) during a registration process with the network operations center node 100 and may update that initial information or provide other information to the network operations center node 100 over time. Example information that can be provided by the electronic device 120 to the network operations center node 100 can include, but is not limited to, the types of information described herein as being communicated by the electronic device 120 responsive to the inquiry message of (block 206).

FIG. 2B illustrates operations by which the network operations center node 100 can authorize request messages from the sensor 110 without communication with the electronic device 120. The operations of FIG. 2B may follow as a continuation of the operations of FIG. 2A (e.g., block 230 of FIG. 2B may follow block 228 of FIG. 2A) or the operations of FIG. 2B may be performed independent of those of FIG. 2A.

Referring to FIG. 2B, in block 230 the sensor 110 sends a request message, which may contain the same information as described above regarding the request message of block 200 of FIG. 2A, to the network operations center node 100. The network operations center node 100 receives (block 232) the request message, and determines (block 234) whether the request is authorized. Whether the request is authorized can be determined based on information that has been obtained from the sensor 110 or another system components and may include, but is not limited to, one or more of the following: who is requesting collection of the information from the electronic device 120; how information collected from the electronic device 120 will be used; an operational characteristic of the sensor 110 (e.g., what type of information the sensor gathers, such as video recording, still frame picture recording, audio recording, text messaging history recording, phone call history recording, device location tracking, fingerprint/palm scanning, facial recognition scanning, iris recognition scanning, etc.); location of the sensor 110; who the information collected from the electronic device 120 will be shared with (e.g., identify cellular network operator, retail establishment(s), local/national government agenc(ies), etc.); and how long the information collected from the electronic device 120 will be retained before permanent deletion from records in memory of the sensor 110 or another system component to which the information will be provided.

When the response is authorized, the network operations center node 100 sends the information requested by the request message to the sensor 110 or another system component that is, for example, identified by the request message. The sensor 110 receives (block 238) the information from the network operations center node 100, and controls its operation (block 240) responsive to the information.

As explained above, the electronic device 120 may provide (e.g., periodically or responsive to defined event(s)) updated information (e.g., sensor updates, location updates, message information updates, call information updates, user information updates, etc.) to the network operations center node 100 for sending, when authorized, to the sensor 110.

FIGS. 12-13 illustrate flowcharts of related operations and methods that may be performed by the sensor 110 according to some embodiments. Referring to FIGS. 12 and 13, the sensor 110 can operate responsive to the information collected from the electronic device 120 to logically associate (block 1200, FIG. 12) the information collected from the electronic device 120 (and other responding ones of the electronic devices 120) with data sensed by the sensor 110 relating to the electronic device(s) 120 and/or users of the electronic device(s) 120 within range of the sensor 110.

When logically associating the information collected from the electronic device(s) 120 with data sensed by the sensor 110, the sensor may generate (block 1300, FIG. 13) metadata from the information collected from the electronic device(s) 120, and send (block 1302, FIG. 13) within a shared data stream the metadata and the data sensed by the sensor relating to the electronic device(s) 120 and/or users of the electronic device(s) 120 within range of the sensor 110.

As explained above, the information received from the network operations center node 100 that is collected from the responding electronic device 120 may include at least one of the following: name of a user of the electronic device 120; home address of the user of the electronic device 120; account information for the user of the electronic device 120; telephone number and/or messaging address for the electronic device 120; a present location of the electronic device 120; information gathered by the electronic device 120 (e.g., sensed accelerometer data, GPS tracked location (s), applications presently being executed and/or historically executed, etc.); and description of appearance of the user of the electronic device 120 (which may have been entered by a user into a user profile retained in memory). Additional or other information may be collected from the electronic device 120. The sensor 110 may include some or all of such information with its sensor data provided to the network operations center node 100 and/or another system element.

Example Sensor, Network Operations Center Node, and Electronic Device

Figure 15:
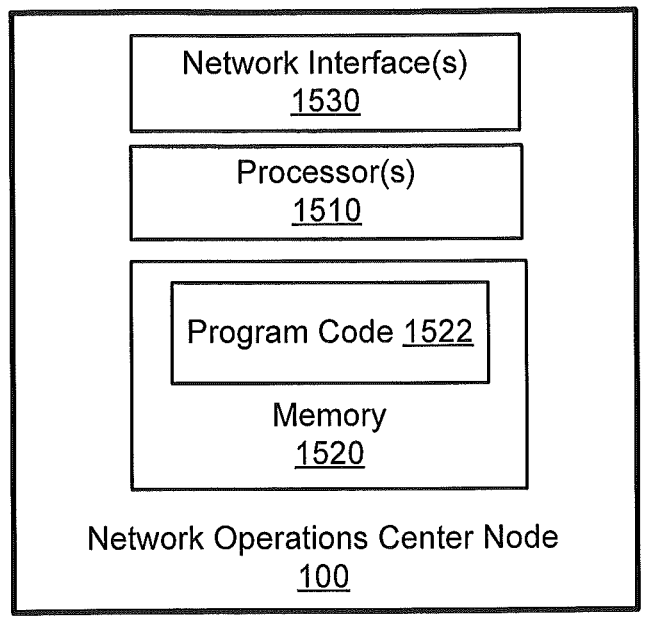
FIG. 15 is a block diagram of an example network operations center node of FIGS. 1 and 2 that is configured according to some embodiments.

FIGS. 14, 15, and 15 are block diagrams of an example sensor 110, network operations center node 100, and electronic device 120, such as those of FIGS. 1 and 2, that are configured according to some embodiments.

The sensor 110 of FIG. 14 may be used as one or more of the sensors of FIGS. 1-2. The sensor 110 can include one or more network interfaces 1430, processor circuitry ("processor") 1410, memory 1420 containing program code 1422, and one or more sensor devices 1440. The sensor device 1440 can be configured to output a video stream, still frame pictures, sampled audio from a microphone, temperature readings, sensed biometric data (e.g., fingerprint/palm scan, facial recognition scan, iris recognition scan, etc.). The sensor device 1440 is not limited thereto as it may be configured to sense other parameters.

The processor 1410 may include one or more data processing circuits, such as a general purpose and/or special purpose processor (e.g., microprocessor and/or digital signal processor) that may be collocated or distributed across one or more networks. The processor 1410 is configured to execute program code 1422 in the memory 1420, described below as a computer readable medium, to perform some or all of the operations and methods that are described above for one or more of the embodiments, such as the embodiments of FIGS. 1-13.

FIG. 15 is a block diagram of an example network operations center node 100 which may be used in the system of FIGS. 1-2. The network operations center node 100 can include one or more network interfaces 1530, processor circuitry ("processor") 1510, and memory 1520 containing program code the 1522. The processor 1510 may include one or more data processing circuits, such as a general purpose and/or special purpose processor (e.g., microprocessor and/or digital signal processor) that may be collocated or distributed across one or more networks. The processor 1510 is configured to execute program code 1522 in the memory 1520, described below as a computer readable medium, to perform some or all of the operations and methods that are described above for one or more of the embodiments, such as the embodiments of FIGS. 1-13.

Figure 16:
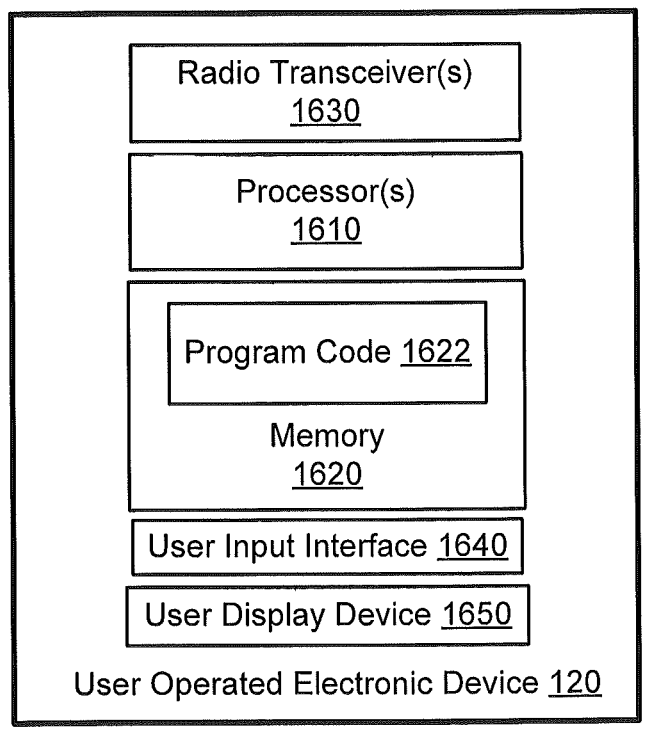
FIG. 16 is a block diagram of an example user operated electronic device of FIGS. 1 and 2 that is configured according to some embodiments.

FIG. 16 is a block diagram of an example user operated electronic device 120 which may be used in the system of FIGS. 1-2. The electronic device 120 can include one or more radio transceivers 1630, processor circuitry ("processor") 1610, and memory 1620 containing program code 1622. The radio transceiver(s) 1630 can be configured to communicate with one or more of the radio access networks 130 of FIGS. 1-2. The radio transceiver(s) 1630 may include a cellular transceiver and/or a WLAN/Bluetooth transceiver. The cellular transceiver may operate according to a cellular radio access technology that may include, but is not limited to, GSM, GPRS, EDGE, DCS, PDC, PCS, CDMA, wideband-CDMA, CDMA2000, UMTS, and/or 3GPP LTE.

The processor 1610 may include one or more data processing circuits, such as a general purpose and/or special purpose processor (e.g., microprocessor and/or digital signal processor) that may be collocated or distributed across one or more networks. The processor 1610 is configured to execute program code 1622 in the memory 1620, described below as a computer readable medium, to perform some or all of the operations and methods that are described above for one or more of the embodiments, such as the embodiments of FIGS. 1-13.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a network operations center node for controlling collection of information from electronic devices, the network operations center node comprising a processor and a memory coupled to the processor and comprising computer readable program code that when executed by the processor causes the processor to perform the method comprising:

receiving, by the processor via a network interface circuit, an information collection disclosure data message from a sensor comprising a video camera and/or an audio microphone configured to communicate video data and/or audio data respectively to the network operations center node, wherein the information collection disclosure data message identifies an entity requesting collection of information from the electronic devices within range of the sensor;

receiving, by the processor via a network interface circuit, a request message from the sensor, the request message requesting collection of information from the electronic devices to provide to the entity requesting collection of information from the electronic devices within the range of the sensor;

selecting, by the processor, one of a plurality of radio access networks based on it being communicatively connected to the electronic devices that are within the range of the sensor;

sending, by the processor via the network interface circuit, an inquiry message to the one of the radio access networks for broadcast to the electronic devices, the inquiry message requesting information from the electronic devices;

receiving, by the processor via the network interface circuit, an authentication message from one of the electronic devices in response to the inquiry message, the authentication message requesting an information collection disclosure response; and sending, by the processor via the network interface circuit to the one of the electronic devices, the information collection disclosure response identifying the entity that is requesting collection of the information from the one of the electronic devices in response to the inquiry message and/or how information collected from the one of the electronic devices will be used;

receiving via the network interface circuit, responsive to the information collection disclosure response, from the one of the electronic devices in response to the inquiry message, information that the network operations center node is authorized to disclose to the sensor for providing to the entity without seeking authorization from the one of the electronic devices;

selectively controlling operation of the sensor to share with the entity, responsive to the information collected by the one of the electronic devices; and logically associating the information collected by the one of the electronic devices with data sensed by the sensor relating to the one of the electronic devices and/or a user of the one of the electronic devices.

2. The method of claim 1, further comprising:
forwarding the information requested by the inquiry message to the sensor.

3. The method of claim 1, wherein:
the authentication message, received from the one of the electronic devices, requests an object comprising an embedded digital signature; and
the information collection disclosure response, sent to the one of the electronic devices, includes the object comprising the embedded digital signature for verification by the one of the electronic devices and identifies the entity that is requesting collection of the information from the one of the electronic devices in response to the inquiry message and/or how information collected from the one of the electronic devices will be used.

4. The method of claim 1, wherein the information collection disclosure response, sent to the one of the electronic devices, further identifies at least one of:
an operational characteristic of the sensor;
a location of the sensor;
an entity that the information collected from the one of the electronic devices in response to the inquiry message will be shared with; and
how long the information collected from the one of the electronic devices will be retained before permanent deletion from records in memory of the network operations center node.

5. The method of claim 1, wherein the inquiry message, sent to the one of the radio access networks for broadcast, requests at least one of the following from each of the electronic devices:
name of a user of the electronic device;
home address of the user of the electronic device;
account information for the user of the electronic device;
telephone number and/or messaging address for the electronic device;
a sensed location of the electronic device;
sensed accelerometer data;
identification of an application being executed by the electronic device;
identification of applications that have been executed by the electronic device; and
description of appearance of the user of the electronic device.

6. The method of claim 1, wherein the request message comprises a first request message, the method further comprising:
receiving, by the processor via a network interface circuit, a second request message from a sensor, the second request message requesting additional information from electronic devices; and
sending, by the processor via the network interface circuit to the, responsive to the second request message and without further interacting with the one of the electronic devices, the information that the network operations center node is authorized to disclose to the sensor without seeking authorization from the one of the electronic devices.

7. A method by an electronic device for controlling collection of information from the electronic device by a network operations center node connected through a radio access network, the electronic device comprising a processor and a memory coupled to the processor and comprising computer readable program code that when executed by the processor causes the processor to perform the method comprising:
receiving, by the processor via a network interface circuit, an inquiry message broadcasted by the radio access network to a plurality of electronic devices, the inquiry message requesting information from the electronic devices for sending to a sensor comprising a video camera and/or an audio microphone configured to communicate video data and/or audio data respectively to the network operations center node;
sending, by the processor via the network interface circuit, an authentication message to the network operations center node that requests an information collection disclosure response;
receiving, by the processor via the network interface circuit, the information collection disclosure response from the network operations center node that identifies an entity that is requesting collection of the information from the electronic device and/or how information collected from the electronic device will be used;
determining, by the processor, whether a response to the inquiry message is authorized based on the information collection disclosure response;
when a response is determined to be authorized, sending, by the processor, information collected by the electronic device that corresponds to the information requested by the inquiry message for use by the network operations center node in controlling the sensor and to logically associate the information collected by the electronic device with data sensed by the sensor; and
sending, by the processor via the network interface circuit to the network operations center node, information that the network operations center node is authorized to disclose to the sensor without seeking authorization from the electronic device.

8. The method of claim 7,
wherein receiving the information collection disclosure response from the network operations center node comprises receiving additional disclosure information identifying at least one of:
an operational characteristic of the sensor;
a location of the sensor;
an entity that is requesting that is requesting collection of the information from the electronic device will be shared with; and
how long the information collected from the electronic device will be retained before permanent deletion from records in memory of the network operations center node; and
wherein determining whether a response to the inquiry message is authorized is further determined based on the additional disclosure information.

9. The method of claim 7, wherein determining whether a response to the inquiry message is authorized comprises:
determining whether a user of the electronic device authorizes disclosure of information requested by the inquiry message based on the identified entity that is requesting collection of the information from the electronic device and/or how information collected from the electronic device will be used.

10. The method of claim 9, wherein determining whether a response to the inquiry message is authorized further comprises:
displaying on a display device information identifying the entity that is requesting collection of the information from the electronic device and/or how information collected from the electronic device will be used, based on the information collection disclosure response from the network operations center node;

receiving a command from the user responsive to the displaying; and determining whether a response to the inquiry message is authorized based on the command from the user.

11. The method of claim 9, wherein:

the authentication message, sent to the network operations center node, requests an object comprising an embedded digital signature;

the information collection disclosure response, received from the network operations center node, includes the object comprising the embedded digital signature; and determining whether a response to the inquiry message is authorized further comprises verifying the object based on the embedded digital signature.

12. The method of claim 7, wherein determining whether a response to the inquiry message is authorized comprises:

determining an authorization level of the sensor from the information collection disclosure response; and determining that a response to the inquiry message is authorized based on the authorization level of the sensor in comparison to a threshold level.

13. The method of claim 12, further comprising:

displaying on a display device information identifying the entity that is requesting collection of the information from the electronic device and/or how information collected from the electronic device will be used, based on the information collection disclosure response from the network operations center node;

determining whether the authorization level of the sensor is exceeds the threshold level;

when the authorization level of the sensor exceeds the threshold level, initiating the sending of information requested by the inquiry message without asking the user for authorization; and when the authorization level of the sensor does not exceed the threshold level, receiving a command from the user responsive to the displaying, and determining whether a response to the inquiry message is authorized based on the command from the user.

14. The method of claim 7, wherein determining whether a response to the inquiry message is authorized comprises:

obtaining user defined privacy settings from a memory of the electronic device; and determining whether a response to the inquiry message is authorized based on the user defined privacy settings.

15. The method of claim 7, further comprising:

determining an authorization level of the sensor from the information collection disclosure response;

selecting among a plurality of different types of information about the electronic device and/or the user responsive to an authorization level of the sensor; and controlling what information requested by the inquiry message is sent based on the selected types of information about the electronic device and/or the user.

16. The method of claim 15, wherein the different types of information about the electronic device and/or the user, which are selected among by the electronic device, comprise at least two of the following:

name of a user of the electronic device;
home address of the user of the electronic device;
account information for the user of the electronic device;
telephone number and/or messaging address for the electronic device;
a sensed location of the electronic device;
sensed accelerometer data;
identification of an application being executed by the electronic device;
identification of applications that have been executed by the electronic device; and
description of appearance of the user of the electronic device.

17. The method of claim 7, further comprising:

registering the electronic device with the network operations center node;

sending electronic device location updates to the network operations center node.

18. A method by a sensor for collecting information from electronic devices, the sensor comprising a processor and a memory coupled to the processor and comprising computer readable program code that when executed by the processor causes the processor to perform the method comprising:

registering the sensor with a network operations center node;

sending, by the processor via a network interface circuit, information collection disclosure data to the network operations center node identifying an entity that is requesting collection of information from electronic devices and/or how information collected from the electronic devices will be used;

sending, by the processor via the network interface circuit, a request message to the network operations center node, the request message requesting collection of information from electronic devices;

receiving, by the processor via the network interface circuit, information from the network operations center node that is previously collected from electronic devices that the network operations center node is authorized to disclose to the sensor without seeking authorization from the electronic devices; and operating the sensor responsive to the information collected from the electronic devices based on logically associating the information collected from the electronic devices with data sensed by the sensor relating to the electronic devices and/or users of the electronic devices, wherein the sensor comprises a video camera and/or an audio microphone configured to communicate video data and/or audio data respectively to the network operations center node.

19. The method of claim 18, wherein logically associating the information collected from the electronic devices with data sensed by the sensor relating to the electronic devices and/or users of the electronic devices, comprises:

generating metadata from the information collected from the electronic devices; and sending within a shared data stream the metadata and the data sensed by the sensor relating to the electronic devices and/or users of the electronic devices.

20. The method of claim 18, wherein the information received from the network operations center node that is collected from the electronic devices, comprises at least one of the following:

name of a user of the electronic device;
home address of the user of the electronic device;
account information for the user of the electronic device;
telephone number and/or messaging address for the electronic device;
a sensed location of the electronic device;
sensed accelerometer data;

identification of an application being executed by the electronic device;
identification of applications that have been executed by the electronic device; and
description of appearance of the user of the electronic device.

\* \* \* \* \*